Figure 6:
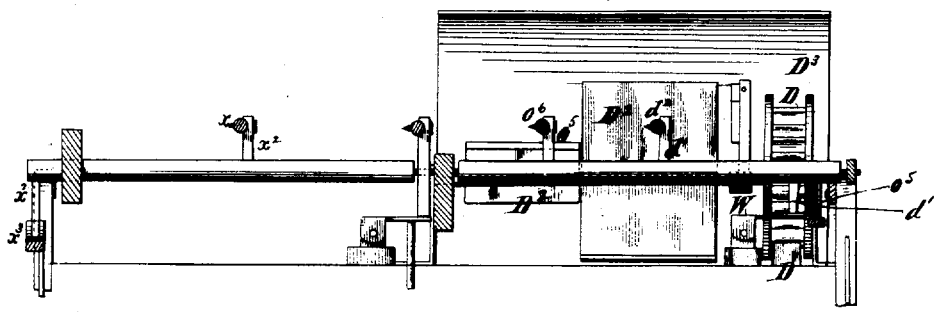

BEST AVAILABLE COPY
2 Sheets—Sheet 1.
M. J. MATTHEWS,
Assignor, by mesne assignments, to THE MASON & HAMLIN ORGAN CO.
Reed-Organ.
No. 9,218. Reissued May 25, 1880.
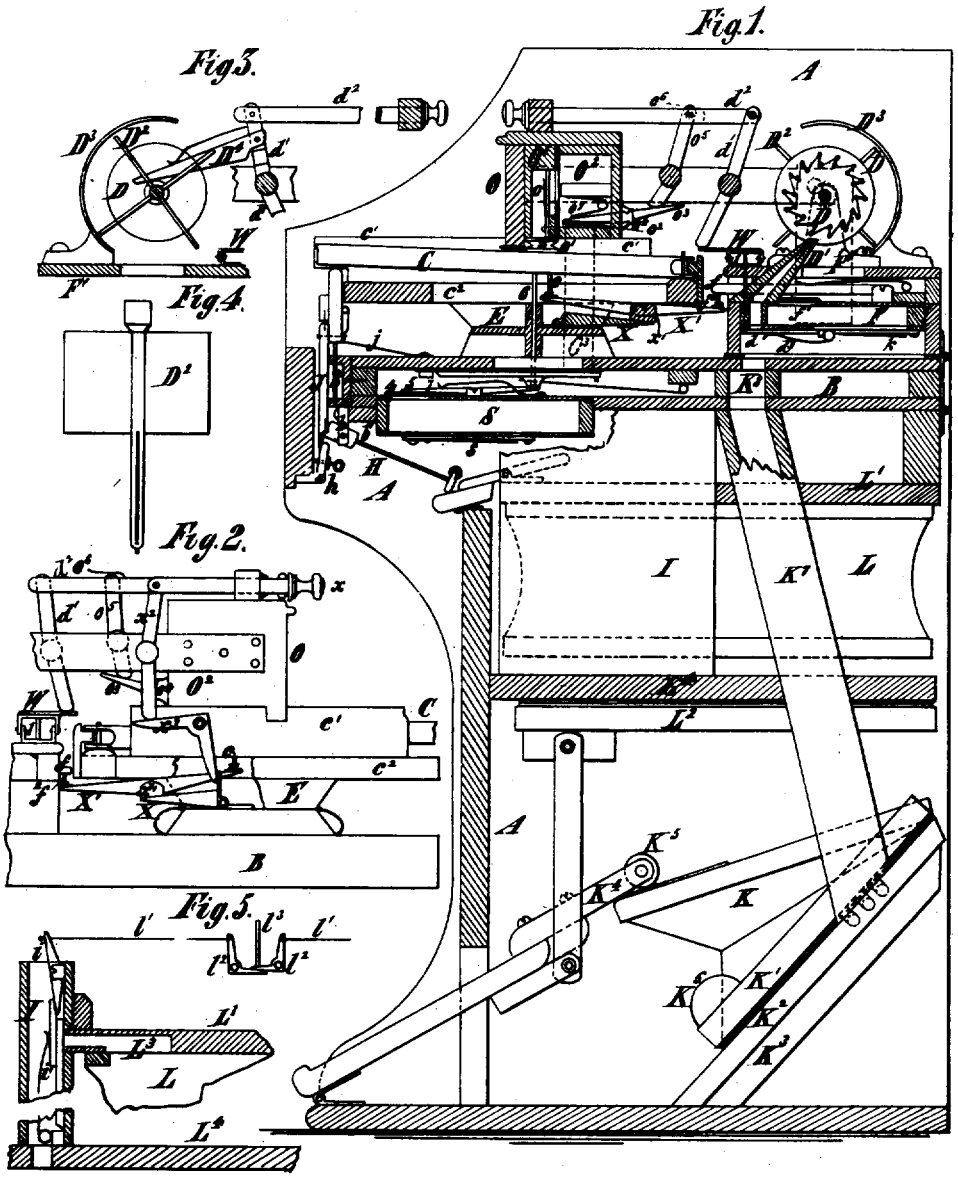
Witnesses
John Becker
Geo. K. Haynes
Inventor
Mason J. Matthews
by his Attorney
Edwin H. Brown
N. PETERS, PHOTO-LITHOGRAPHER, WASHINGTON, D. C.

2 Sheets—Sheet 2.

M. J. MATTHEWS,

Assignor, by mesne assignments, to THE MASON & HAMLIN ORGAN CO.

Reed-Organ.

No. 9,218. Reissued May 25, 1880.

Witnesses:
T. J. Keane
E. P. Jessup.

Inventor:
Mason J. Matthews
By his Attorney
Edwin H. Brown

N. PETERS, PHOTO-LITHOGRAPHER, WASHINGTON, D. C.

UNITED STATES PATENT OFFICE.

MASON J. MATTHEWS, OF BOSTON, MASSACHUSETTS, ASSIGNOR, BY MESNE ASSIGNMENTS, TO THE MASON & HAMLIN ORGAN COMPANY.

REED-ORGAN.

SPECIFICATION forming part of Reissued Letters Patent No. 9,218, dated May 25, 1880.

Original No. 148,482, dated March 10, 1874. Application for reissue filed July 25, 1879.

*To all whom it may concern:*

Be it known that I, MASON J. MATTHEWS, formerly of New York city, in the State of New York, but now of Boston, in the State of Massachusetts, have invented certain new and useful Improvements in Reed-Organs, of which the following is a specification.

The objects of my invention are, first, to make such additions as will produce in one and the same instrument the characteristic effects of the harmonium and American reed-organ; second, to produce more telling, emotional, and string-like effects than are obtainable in existing instruments; third, to proportion the weight of the touch to the number of sets of reeds in play, (when much power is obtained from an instrument heavy touch seems natural, but the reverse is the case when soft music is being produced;) fourth, to provide for coupling a bank or series of reeds at will; fifth, to provide a simple and efficient stop mechanism; sixth, to provide for arranging in an upright position a series of reeds behind the name-board of the instrument, where they will occupy but little space, and for operating the same by valves carried by the keys; seventh, to provide a simple arrangement for the application of the stop usually termed "percussion;" eighth, to make such wind-connections as will leave available for desirable purposes a most important part of the instrument, besides admitting of a simple application of the well-known expression-stop to a suction instrument; ninth, to so operate the fan connected with the vox-humana stop that it will revolve at a desirable and uniform speed; tenth, to so arrange the several parts that they will be of easy access for adjustment or repair.

The following is a description of what I consider the best means of carrying out the invention.

The accompanying drawings form a part of this specification.

Figure 1 is a vertical cross-section through the entire instrument. The section is not in one continuous plane. The lower and middle portion is nearer the eye than the upper portion. So, also, the section of the nozzle through which air is blown upon the motor-wheel of the vox-humana is nearer the eye than are the parts on each side of it. The drawing is intended to represent the novelties clearly with but a small number of figures. Fig. 2 represents some of the parts in the upper portion as seen from the side opposite that from which Fig. 1 is taken. In Fig. 2 the coupler-stop is represented as drawn out, so as to cause the vox-humana reeds to sound with the others. Fig. 3 represents certain parts as seen from the same side of the instrument as Fig. 2. This shows provisions to aid in starting and stopping the vox-humana fan. Fig. 4 represents my vox-humana fan detached. Fig. 5 is a longitudinal section through certain portions. It shows the arrangement of the expression-valve and adjacent parts. Fig. 6 is a vertical longitudinal section through a portion of the instrument, illustrating part of the stop mechanism.

Similar letters of reference indicate like parts in all the figures.

A is the fixed frame-work. At each side of my instrument is a single trunk or passage, I, communicating at the top with a wind-chest, B, through openings in the bottom board of the latter, and provided at the foot with openings establishing communication with the exhausts $L^2$. (A trunk at one side would do if large enough). On the lower side of the support-board $L^4$, and below each trunk, is a small leather valve for preventing the return of air into the wind-chest B. A suction-reservoir, L, is attached to a support-board, $L'$, and within the thickness of the support-board $L'$ (see Fig. 5) are formed channels or openings $L^3$, which establish communication between said reservoir L and the trunks I through the sides of the latter. These channels or openings $L^3$ are controlled by expression-valves $i'$, opened or closed through the medium of levers $i$, connecting-rods $l'$ $l'$, elbow-levers or bracket-levers $l^2$ $l^2$, push-pin $l^3$, and a suitable stop-draw.

The wind-chest B is shown as hinged at the back, and rests on the top of the trunks I.

To the under side of the wind-chest B a modification of the harmonium-reed pan S is attached. It is leathered around its edges and hinged at the back, so that it will rise and fall for coupling and swell purposes without causing leak. The naked reeds $s$ are screwed to the under surface of this pan S. The passage of air through the ducts or passages of this reed-pan is controlled by valves 4, attached to one end of levers 5, which at the other end are depressed by rods 6, actuated by the contact therewith of the under side of the keys C. Springs 7 hold the valves 4 to their seats when not actuated by the levers 5.

In the percussion or hammer action, which in this instrument strikes the reeds *s*, the regulator *h* is attached to the lock-board of the instrument. The hammer-hinge piece *b* is screwed or otherwise fastened to a block, *b'*, and does not form a part of the guide-piece $b^2$. The hopper J is sprung upward from the upper surface of the wind-chest B by a spring, *j*.

The upper reed-chest, O, above the key-board, as here shown, is peculiar, from the fact that the reeds *o* therein are placed in tubes or air-ducts, in a board, O', glued or fastened to a wind-chest, $O^2$, and are above the keys C and in a vertical position, instead of being arranged horizontally.

Self-adjusting spring pallet-valves *o'*, attached to the keys C by flexible connections and forced upward by a spring, act on the mouths of the tubes or air-ducts in the tube-board O' at the heels of the reeds, which are flush therewith.

It would not be difficult to make the pallet-valves open on the front side of the board O' and in sight of the player; but the former plan is preferable.

Air communication between the wind-chest $O^2$ and the wind-chest B is made by a duct or passage, $O^3$, extending through the key-block *c'*, key-frame $c^2$, and end of the tube-board E, (see dotted lines in Fig. 1,) and beyond the range of the reeds *o*. An opening at each end will be necessary when bass and treble are desired. A trunk might be used instead of air-passages, as described, but it would take up room necessary for part of my stop-work. This wind-passage $O^3$ is controlled by a valve, $o^2$, attached to a lever, $o^3$, and acting upon its top opening. The lever $o^3$ projects beyond the range of the reeds *o*, through the back of the wind-chest $O^2$, and through a packing or nipple of leather, $o^4$, which is glued or attached to both to prevent leakage.

The opening and closing of the valve $o^2$ are determined by a lever, $o^5$, the lower end of which acts like a toe or wiper on the outer end of the lever $o^3$ in connection with a stop-draw, $o^6$, attached thereto, and consisting of a sliding rod extending over the reed-chest O, and a spring, $o^7$, acting to depress the inner end of the lever $o^3$ inside the wind-chest $O^2$.

The lever $o^5$ consists of a rock-shaft extending parallel with the front of the reed-chest O, known commonly as the "name-board" of the instrument, and from the stop-draw rod $o^6$ to the lever $o^3$, beyond the range of the reeds, said rock-shaft being provided with an arm for attachment to the stop-draw rod, and at a considerable distance to one side with another arm for acting upon the lever $o^3$.

The tube-board E, key-frame $c^2$, and keys C may be of ordinary construction, excepting the hole through the end, as explained The following describes the pressure part of my instrument: The bellows are located toward the bottom and back of the case. K is the feeder. K' is the reservoir. $K^2$ is the support-board. $K^3$ are blocks secured to the inside of the case. The feeder K is held open by a spring, which may be within the feeder or may be outside, in which latter case the ordinary organ-bellows spring may be used.

The piece $K^4$, with pulley $K^5$, is attached to a foot-pedal. There are three of these foot-pedals, two for suction and one for pressure apparatus. The pressure-pedal, on being depressed, forces the air up through suitable channels formed in the support-board $K^2$, the trunk $K^7$, the block $K^8$, to the pressure-reed pan F, (which is hinged at the back and held down on soft cushions of leather by harmonium-hooks, one at each end,) and down through a similar block and trunk and passages at the opposite end of the instrument to the reservoir K' and inflates it. An attached leaden or other weight, $K^6$, and the weight of the board to which it is fastened force the air back to the pressure-reed pan F, so that a constant and steady supply is insured.

The reeds in harmonium-pans are screwed on and are inside of the pans. The pallet-valves are outside. Of these pallet-valves there are sixty-one, or a number according to the compass of the instrument; but I will describe only one, it being understood that the others are the same. In my instrument the lever *f*, to which the pallet-valve *f'* is attached, reaches over the front of the pan. The parts nearer the front of the instrument, marked X X' *x x'* $x^2$ $x^3$, form a coupler for the pressure-reed pan F. A fulcrum-piece, X, consisting of a strip or slat extending through the compass of the keys, is hinged at the edge nearest the front of the instrument on the upper face of the tube-board E, so that it may be raised and lowered relatively thereto.

$x^3$ (see Fig. 2) is an elbow-lever pivoted to the key-block *c'*, engaging at one end with an upward extension from the fulcrum-piece X, and actuated at or near the other end by a lever, $x^2$, impinging upon it as a toe or wiper, and connected to a stop-draw, *x*, consisting of a sliding rod. The lever $x^2$ consists of a rock-shaft extending parallel with the name-board of the instrument, and provided with an arm suitably disposed for convenient connection with the stop-draw rod *x*, and another arm suitably disposed for actuating the elbow-lever $x^3$.

When the fulcrum-piece X is raised by drawing the stop *x* (see Fig. 2) levers X', provided with fulcrum-pins supported in grooved bearings *x'* on the fulcrum-piece X, are raised bodily, so that their front ends are brought in contact with screws *c*, extending from the keys C, and their back ends in contact with screws $f^2$, extending from the lever *f*, whereby when one of the keys is depressed the front end of the corresponding lever $f$, with the pallet-valve $f'$ attached, is caused to rise, and, if the wind is supplied, the corresponding reed to speak. When the stop-draw $x$ is pushed in, the upper end of the elbow-lever $x^3$ rises and permits the coupling mechanism to fall by its own weight.

It would be easy to control the speaking of the back set of reeds by an air-valve; but in that case the main wind-chest would have to be partitioned off. This would be objectionable in that it would rob the ordinary reeds of the necessary resonance. The tension, also, of the back set of springs would always be felt in the touch. With the coupling this tension is only felt when the reeds $k$ are in play.

F′ designates a sound-board or reflector-board placed and properly fastened over the pressure-reed pan F, and having an opening, over which, in proper bearings and connections, is mounted my modification of the vox-humana or fan-tremolo.

A twofold object is attained in thus mounting the fan-tremolo: first, the tone of the pressure-reed is deflected outward upon the fan, and is more sensibly affected than it would be if drawn away from it, as in an ordinary suction instrument; second. steady and uniform revolutions result from this application of a wind apparatus separate and distinct from the main bellows of the instrument.

I employ for operating the fan an uninclosed motor, D, formed of two light and thin disks, of wood or other material, distant from each other about an inch, more or less, and connected by pegs of wood or wire, arranged at proper intervals in two circles. A strip of paper or other light substance is interlaced about these pegs, over the outer and under the inner pegs, so that a ratchet-shaped wheel, such as is shown in Fig. 1, is produced.

The air which drives the motor D passes from the pressure-reed pan F through a conductor or nozzle, D′, under control of a valve, $d$, arranged inside the reed-pan, and held to its seat, when not otherwise actuated, by a spring, $d^3$. A pin, 1, extends from the under side of the platform W to this valve $d$, and a lever, $d'$, actuated by a stop-draw consisting of a sliding rod, $d^2$, serves to depress the same and open the valve.

The lever $d'$ consists of a rock-shaft extending parallel with the name-board, and provided with an arm disposed suitably for connection with the stop-draw rod $d^2$, and another arm disposed suitably for acting on the platform W.

Thus the fan $D^2$ and reeds $k$ can be used separately or together, at pleasure. This is important, as the upper set of reeds on the suction part of the instrument is also affected by the fan.

The fan (see particularly Fig. 4) consists of separate sets of blades $D^2$, each being only half of the length of the entire fan, and the different sets being arranged at right angles to each other—that is, those at one end are at right angles with those at the other end. This arrangement breaks up the tone and gives a string-like effect instead of the marked pulsations which so much resemble the ordinary valve-tremolo.

When the fan is extended to influence both the bass and treble portions of the instrument, a repetition of the blades at the same angle should be fixed to a longer axle. In such case there would be eight blades instead of four, as in the former case.

$D^3$ designates a screen at the back of the fan, serving to direct the sound forward toward the player and the wind-pulsations toward the suction-reeds, so that they may be more sensibly affected than they would otherwise be.

$D^4$ (see Fig. 3) is a starter for the purpose of overcoming the inertia and giving momentum to the fan simultaneously with the drawing of the stop to which it is attached. It consists of an arm jointed to the lever $d'$, and bearing upon the shaft of the tremolo, so that its under surface exerts a considerable friction on said shaft when drawn forward in the act of letting on the wind, and thus aids in setting it instantly in motion at full speed. When fully drawn forward it is clear of the shaft, and is then held up by contact with the shoulder $d^2$ on the lever $d'$.

An important feature of this instrument is the hinging of the upper actions to each other and to the wind-chest B. The upper tube-board and wind-chest, with the stop-work attached thereto, are hinged as follows: A piece of wood or metal, in which the pivots of the stop-rollers work, is screwed to each end of the reed-chest O, and extends backward and is pivoted to an upright (shown by dotted lines in Fig. 1) fastened to each end of the pressure-reed pan F. The upper reed-chest, O, may also be held down by hooks. The main wind-chest B, being hinged at the back, may be lifted from the trunks I.

It will be seen that by these arrangements the various parts are accessible without inconvenience.

It may not be necessary to explain the advantages or give the reasons in full for all the features above described. Thus, in reference to the springs for the reservoir K′, it will be understood that a weighted reservoir having uniform pressure for operating reeds alone may not be so good as reservoirs acted on by springs, which give variations of pressure and power.

Many of the features of my instrument may be greatly varied without sacrificing all the benefits of the invention. For example, it might be preferable to inclose the expression-valve $i'$ in a box, with openings into both the reservoir L and wind-trunk I, so that the tendency of the air-current would be to keep the valve closed. It is practicable to mount the reeds in the tube-board O′ in any position between the vertical and horizontal, and at the same time to control the speaking by my self-

BEST AVAILABLE COPY adjusting pallet-valves $o'$. It is also optional to place the tube-board O′ in its forward position above the stop-rail, in which case tracker-pins will connect the pallet-valves $o'$ with the keys C, and the stop-draws will pass between the said tracker-pins.

It is optional, for the mounting of my tremolo, either to add a supplementary pressure or suction bellows to a suction instrument or a a supplementary pressure and suction bellows to a pressure instrument. It is also optional to drive the fan through the medium of an ordinary inclosed motor with suitable valve attachments.

Flexible tubing may be used for air communication instead of the trunks $K^7$.

I am aware that organs have been made in which reeds were arranged in an upright position in the front of the instrument, and also that organs have been made with valves attached to the keys for controlling the action of the reeds; and I do not therefore claim this as my invention.

I claim as my invention—

1. The expression-valve $i'$ in the trunk I, in combination with the chest B, bellows or exhaust $L^2$, and reservoir L, substantially as herein specified.

2. The levers $i$, connections $l'$, bracket-levers $l^2$, and pin $l^3$, connecting from the stop-draw to the said expression-valves $i'$, the several parts being arranged relatively to each other and to the support-board L′ and reservoir L, and to the bellows $L^2$, as and for the purposes specified.

3. The reed-pan S, with its naked reeds $s$, mounted below the main wind-chest of a suction-reed musical instrument, as herein specified.

4. In combination with reeds and bellows, a percussion action consisting of hammers H, hoppers or jacks J, springs $j$, and regulators $h$, when combined and arranged as and for the purposes specified.

5. The reed-pan S, with reeds $s$ and suitable connections to suction-bellows, in combination with each other and with a percussion action, when the reeds $s$ and the percussion mechanism are arranged outside the wind-chest, all substantially as herein specified.

6. In a musical instrument, the combination, with a stop-draw rod and a device to be actuated thereby arranged at one side of the stop-draw rod, of a rock-shaft extending from the vicinity of the stop-draw rod to the vicinity of the device to be actuated thereby, and provided with an arm for connection to the stop-draw rod, and with an arm located at some distance from the former for imparting motion to the device which is to be actuated by the stop-draw rod, substantially as and for the purpose specified.

7. In a musical instrument, the combination, with a stop-draw rod and a device to be actuated thereby arranged at one side of the stop-draw rod, of a rock-shaft parallel with name-board, provided opposite the stop-draw rod with an arm for connection to the stop-draw rod, and provided at a distant point with an arm for imparting motion to the device to be actuated by the stop-draw rod, substantially as and for the purpose specified.

8. In a musical instrument, the combination, of a series of reeds arranged in an upright position in air ducts or passages behind the name-board, and pallet-valves mounted on the keys and controlling the operation of the said reeds, substantially as specified.

9. In a reed musical instrument, the air-passage $O^3$, valve $o^2$, and the lever $o^3$ in the upper reed-chest, O, all arranged above and toward the front of the keys and wind-chest B, substantially as specified.

10. The coupling action between the keys C and pallet-levers $f$, consisting of the hinged piece X, carrying coupling-levers X′, and suitable connections to the stop-draw $x$, combined and arranged as and for the purpose herein specified.

11. The reed-pan F, with its connecting feeder K, reservoir K′, support-board $K^2$, and suitable wind-passages, all arranged to be operated substantially as described, in combination with reeds operated by a separate wind apparatus, as herein specified.

12. In a reed or cabinet organ, a fan-tremolo, in combination with means for operating the reeds K of the pan F by pressure and blowing outwardly through the tremolo, as herein specified.

13. The supplementary pressure-reservoir K′ and feeder K, in combination with a suction instrument and means for operating a tremolo-fan by blowing a connected motor, when said parts are combined and arranged substantially as specified.

14. The pressure wind apparatus K K′, pressure-reed pan F, and mechanism for blowing upon the fan-tremolo motor D, in combination with suction-reeds and suction wind apparatus, as herein specified.

15. The uninclosed fan-motor D, arranged relatively to the fan-tremolo $D^2$ and to a set of pressure-reeds, $k$, as herein specified.

16. An uninclosed fan-motor, in combination with the directing-nozzle D′ and suitable connections for conducting the air thereto, and with the controlling-valve $d$, all substantially as herein specified.

17. The screen $D^3$, in combination with motor D, and arranged relatively to the fan or tremolo as and for the purposes described.

18. The top chest, O, and its connections and the reed-pan F and its connections, hinged together and to the body of the instrument, so as to be conveniently opened and closed, as and for the purposes herein specified.

In testimony that I consider the above to be my invention I hereunto subscribe my name.

MASON J. MATTHEWS.

Witnesses:

JAMES W. CURRIER,
JAMES HOLLYER.